United States Patent [19]
Conrads et al.

[11] Patent Number: 6,073,651
[45] Date of Patent: Jun. 13, 2000

[54] DAMPED VALVE

[75] Inventors: Hermann-Josef Conrads, Herzogenaurach; Erwin Laurer, Möhrendorf; Jürgen Model; Ullrich Preiss, both of Erlangen, all of Germany

[73] Assignee: Siemens Aktiengesellschaft, Munich, Germany

[21] Appl. No.: 09/119,720

[22] Filed: Jul. 20, 1998

Related U.S. Application Data

[63] Continuation of application No. PCT/DE97/00025, Jan. 9, 1997.

[30] Foreign Application Priority Data

Jan. 19, 1996 [DE] Germany .......................... 196 01 856

[51] Int. Cl.$^7$ .......................... F16K 37/00; F16K 31/363; F16K 31/42
[52] U.S. Cl. .............................. 137/556; 251/33; 251/36; 251/50
[58] Field of Search ................................ 251/33, 36, 50; 137/556

[56] References Cited

U.S. PATENT DOCUMENTS

| 2,038,167 | 4/1936 | Farmer et al. | 251/36 X |
| 2,329,001 | 9/1943 | Robinson | 251/36 |
| 2,329,011 | 9/1943 | Robinson | 251/36 |
| 3,971,412 | 7/1976 | Wierzbicki | 251/33 X |
| 4,482,127 | 11/1984 | Hafele | 251/36 X |
| 5,873,561 | 2/1999 | Bourkel et al. | 251/36 |

*Primary Examiner*—John Rivell
*Attorney, Agent, or Firm*—Herbert L. Lerner; Laurence A. Greenberg; Werner H. Stemer

[57] ABSTRACT

A valve includes a device for shutting off a valve interior. The shutoff device is positioned by a piston which is guided in a cylinder and forms a first chamber and a second chamber in the cylinder. The second chamber communicates with the valve interior through a throttle path, so that the shutoff device is movable in a damped manner in both closing and opening directions.

9 Claims, 10 Drawing Sheets

DAMPED VALVE

CROSS-REFERENCE TO RELATED APPLICATION

This application is a continuation of International Application PCT/DE97/00025, filed Jan. 9, 1997, now abandoned, which designated the United States.

BACKGROUND OF THE INVENTION

1. Field of the Invention

The invention relates to a valve having a device for shutting off a valve interior, a cylinder, and a piston guided in the cylinder for positioning the shutoff device and forming a first chamber and a second chamber in the cylinder.

A shutoff valve which is known from Published European Patent Application 0 124 821 A1, corresponding to U.S. Pat. No. 4,607,822, has a piston guided in a first cylinder. The piston is connected to a conical shutoff device through a piston rod guided in a second cylinder. A chamber formed by the bottom of the piston and the bottom of the first cylinder communicates with an annular relief chamber, through a narrow throttle gap and an adjoining wide throttle gap between the piston rod and a wall surface of the second cylinder. Control bores lead from the relief chamber to control valves.

The control valves are opened to close the valve. Pressure medium escapes over the throttle gaps through the control bore provided in the relief chamber. As a result, the piston moves downward. At the same time, the geometry of the throttle gaps changes so that the proportion of the wide throttle gap is reduced in favor of the narrow throttle gap. Accordingly, the damping becomes greater, the farther the second piston is moved into the closing position of the valve. Thus, the conical shutoff device is moved onto its seat counter to an increasing damping force. That reference says nothing else about the function of the valve.

A disadvantage of that valve is that because of its non-linear damping, it can be used only as a shutoff valve. Moreover, the valve known from the prior art is not suitable for blowing off multiphase mixtures, of the kind that can occur in the primary loop of nuclear power plants that have a pressurized water reactor.

SUMMARY OF THE INVENTION

It is accordingly an object of the invention to provide a damped valve, which overcomes the hereinafore-mentioned disadvantages of the heretofore-known devices of this general type, which is constructed as simply as possible and which is universally usable.

With the foregoing and other objects in view there is provided, in accordance with the invention, a valve, comprising a valve interior; a shutoff device for the valve interior, the shutoff device moveable in closing and opening directions; a first cylinder; a piston guided in the first cylinder for positioning the shutoff device and forming a first chamber and a second chamber in the cylinder; a throttle path communicating between the second chamber and the valve interior for damped movement of the shutoff device in both the closing and opening directions; and a bore connecting the valve interior to the first chamber.

With this configuration, valve control can be made available in a simple, economical way that always assures an identical input or removal of pressure medium to and from the second chamber. Thus a uniformly damped motion of the shutoff device is possible at all times in both the opening and the closing directions.

The pressure of the valve interior acts directly upon the first chamber due to the bore.

In accordance with another feature of the invention, the throttle path is formed by at least one overflow conduit provided with a throttle insert.

In accordance with a further feature of the invention, the throttle path is formed by at least one throttle gap between a wall surface of a second cylinder on one hand and a damping piston, guided therein on the other hand, the damping piston connecting the shutoff device and the piston.

In accordance with an added feature of the invention, the damping piston has at least one groove for receiving a piston ring. It is thus possible to adjust the damping performance as needed.

In accordance with an additional feature of the invention, there are provided at least two throttle gaps of different pressure fluid admissibility. This forms a first throttle gap, for instance between the wall surface of the second cylinder and the wall surface of the damping cylinder, and a second throttle gap between the wall surface of the second cylinder and at least one piston ring received on the damping piston. The pressure medium admissibility of the first and second throttle gaps can be varied on one hand by their width and on the other hand by the number and/or slackness or play of the piston rings being used.

In accordance with yet another feature of the invention, the damping piston has a constricted portion, and the second cylinder has a protrusion corresponding to the constriction.

In accordance with yet a further feature of the invention, the protrusion and the constricted portion, like the throttle gap or gaps, are constructed in an encompassing manner.

In accordance with yet an added feature of the invention, there is provided a device for indicating a stroke of the first piston.

In accordance with a concomitant feature of the invention, there is provided at least one shutoff element with which a pressure prevailing in the first chamber can be relieved. Thus the adjusting motion of the shutoff device can be controlled.

Other features which are considered as characteristic for the invention are set forth in the appended claims.

Although the invention is illustrated and described herein as embodied in a damped valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
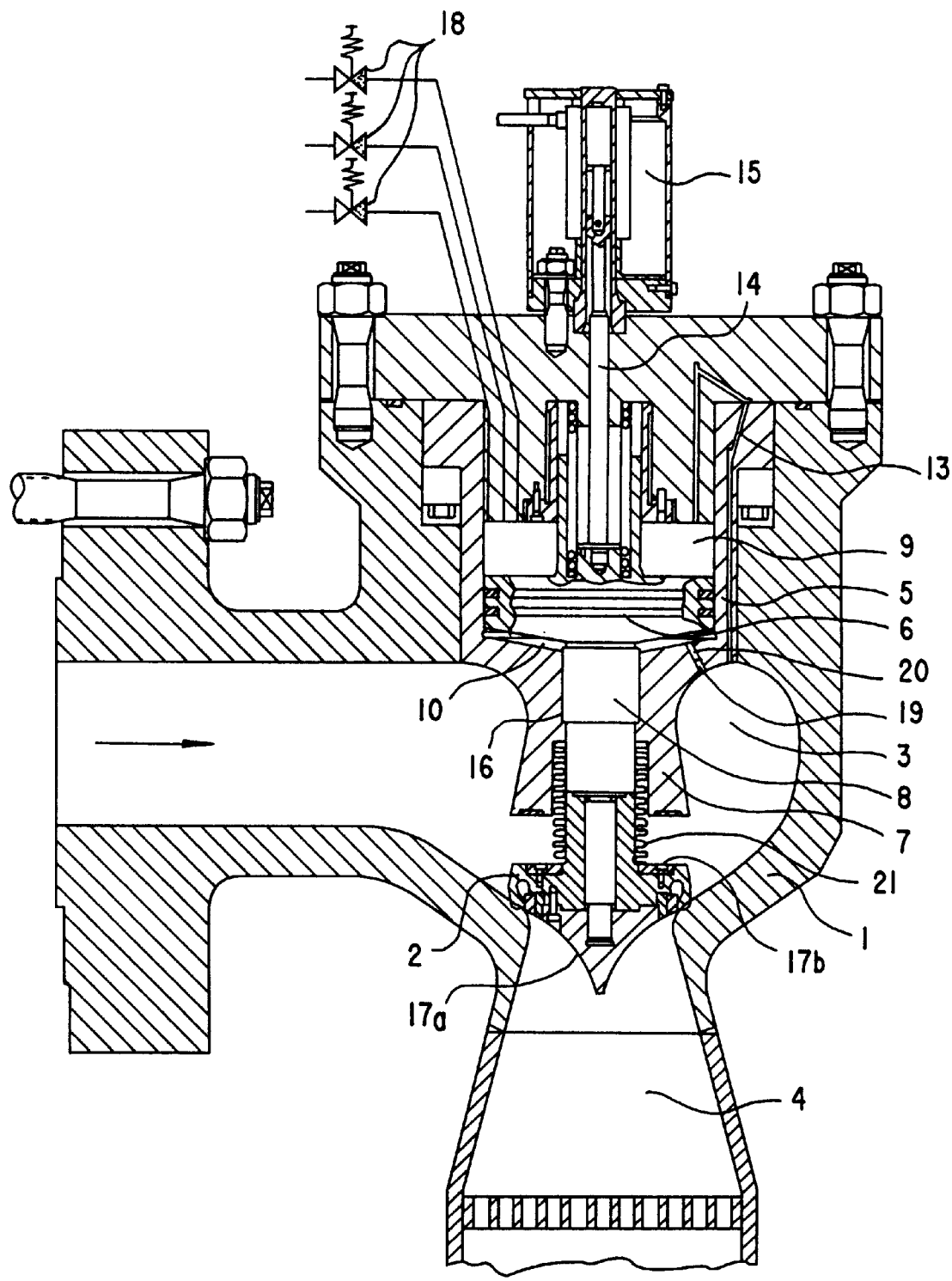
FIG. 1 is a fragmentary, diagrammatic, vertical-sectional view of a first exemplary embodiment of the invention.

Referring now to the figures of the drawings in detail and first, particularly, to FIG. 1 thereof, there is seen a first exemplary embodiment of the invention having a housing 1 of a valve in which a valve interior 3 acted upon by pressure is separated from a blowoff stub 4 by a valve cone 2. The valve cone 2, which may be referred to as a device for shutting off the valve interior 3, is connected to an adjusting piston 6 in an adjusting cylinder 5. The adjusting piston 6 is guided in the adjusting cylinder 5 through the use of a damping piston 8, that is guided in a damping cylinder 7. The adjusting piston 6 forms a first control chamber 9 and a second damping chamber 10 in the adjusting cylinder 5. The damping chamber 10 communicates with the pressure-impinged valve interior 3 through an overflow conduit 20 provided with a throttle insert 19 and forming a throttle path. A lower portion of the damping piston 8 is provided with a bellows 21, which seals off the damping piston 8 from the valve interior 3. A bore 13 connects the valve interior 3 with the control chamber 9. The adjusting piston 6 is connected through a rod 14 to an inductive adjustment indicator 15. Schematically shown control valves 18 separate the control chamber 9, which is acted upon by pressure during normal operation, from a space of lesser pressure, such as the environment.

Figure 2:
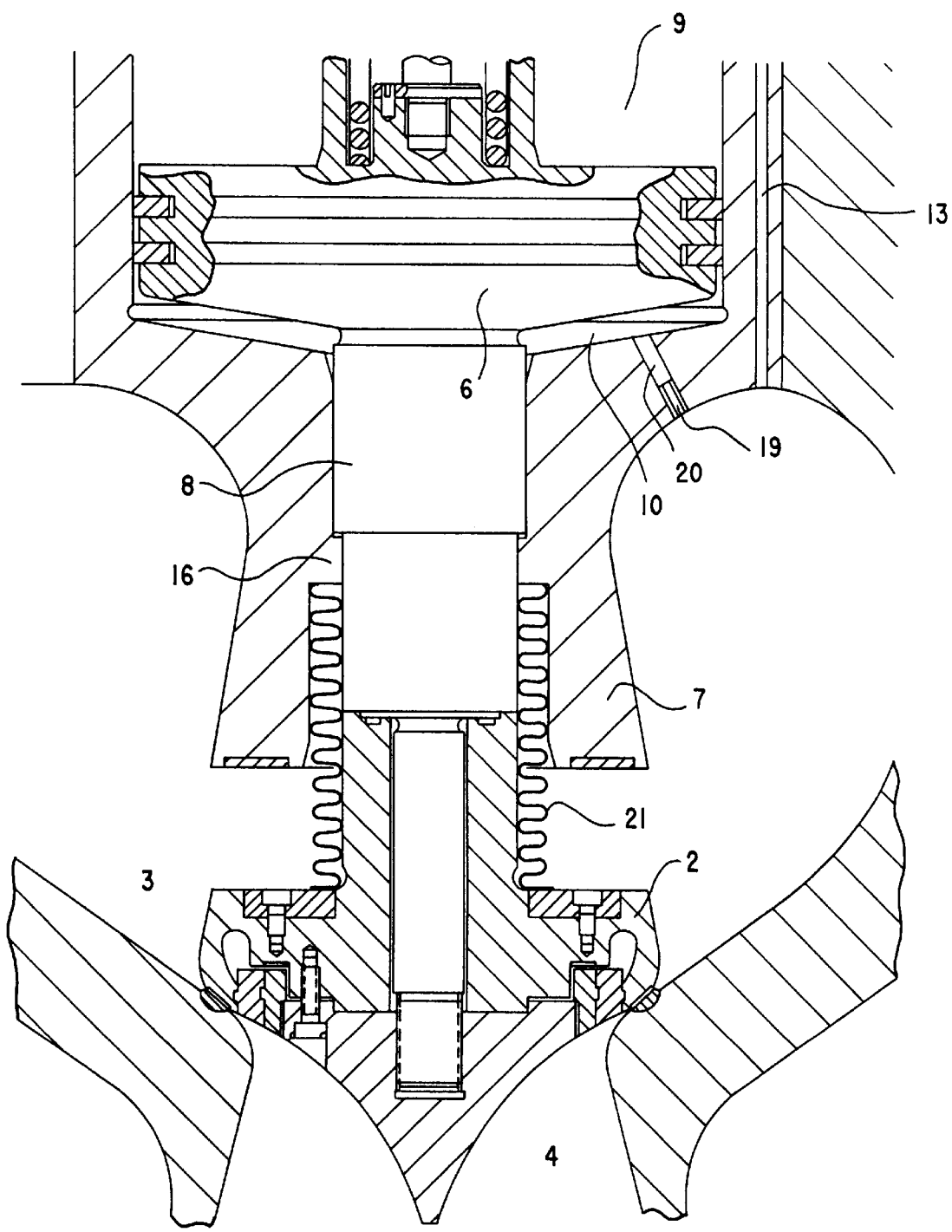
FIG. 2 is an enlarged, fragmentary, vertical-sectional view of a portion of FIG. 1.

FIG. 2 is an enlarged view which again shows the valve of FIG. 1. This view in particular shows that the damping cylinder 7 has an inward-protruding portion 16 which guides the damping piston 8.

Figure 3:
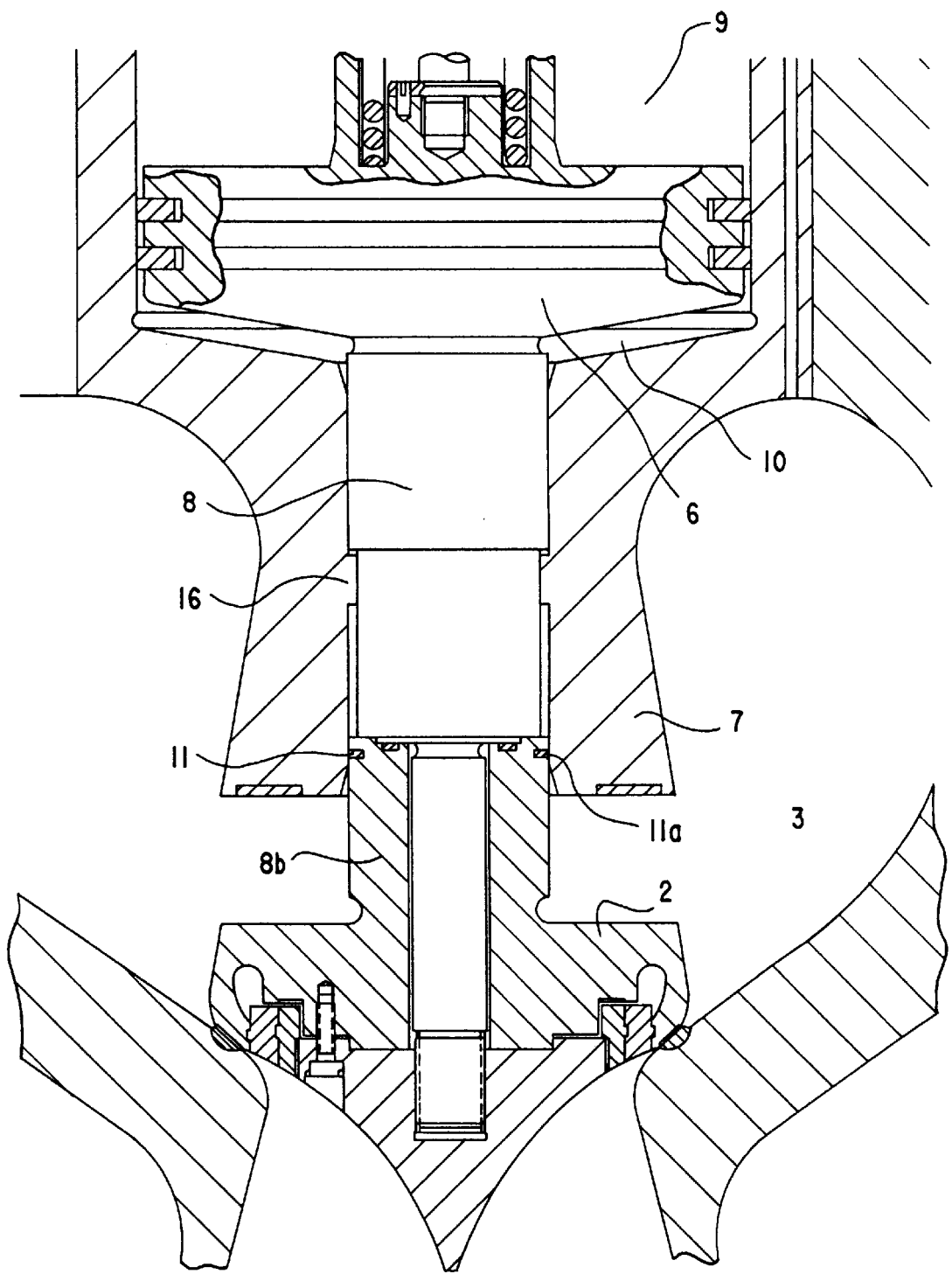
FIG. 3 is a view similar to FIG. 2 of a second exemplary embodiment of the invention.

FIG. 3 shows a second exemplary embodiment of the invention. In contrast to the first exemplary embodiment, a throttle path in this case is formed by a first throttle gap 11 between a piston ring 11a and a wall surface of the damping cylinder 7.

Figure 4:
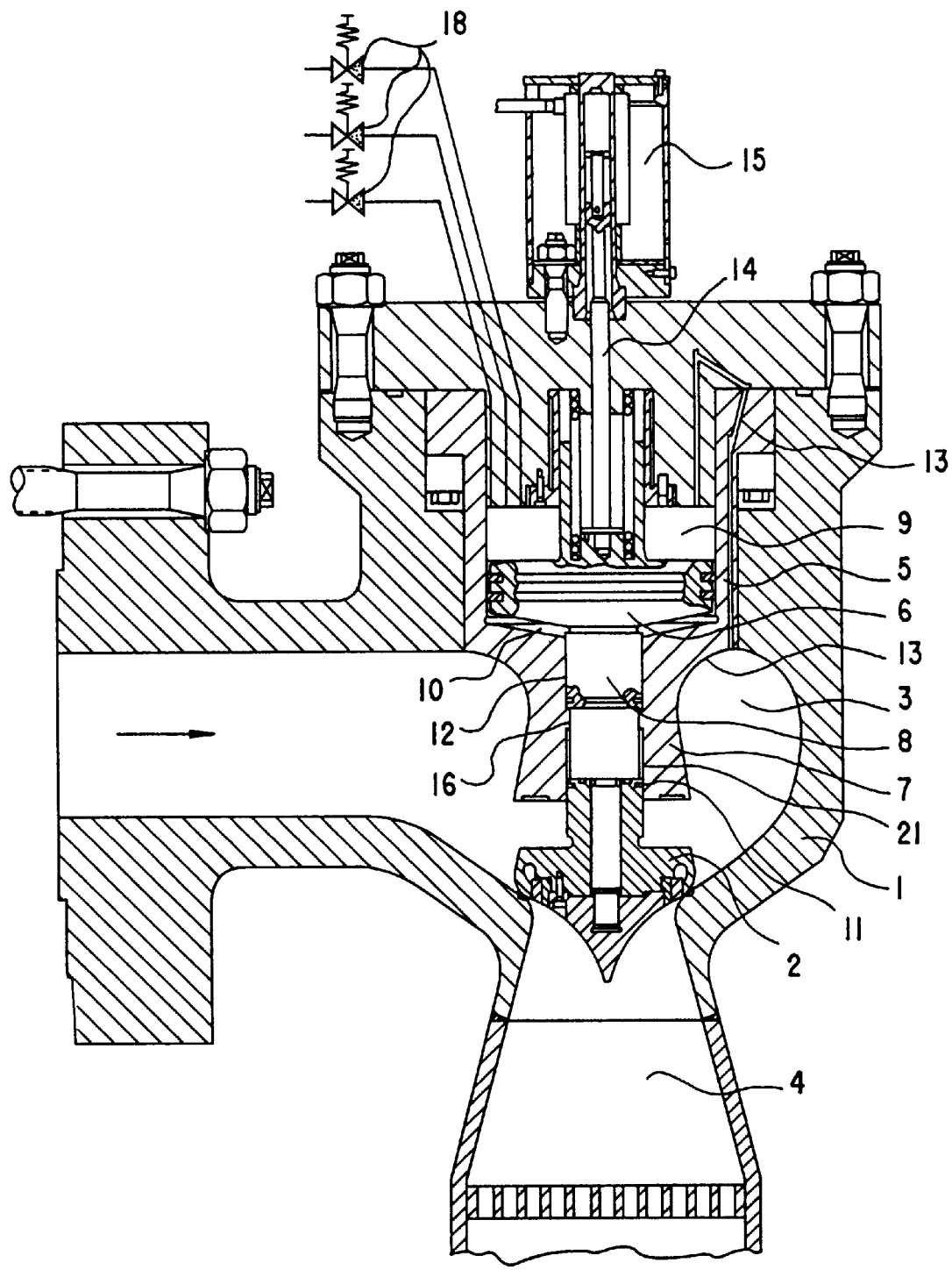
FIG. 4 is a fragmentary, vertical-sectional view of a third exemplary embodiment of the invention, in which the valve is closed.

FIG. 4 shows a third exemplary embodiment of the invention. In this case the first throttle gap 11 as well as a second throttle gap 12 are provided. The second throttle gap 12 is formed between a wall surface of the damping piston 8 and the wall surface of the damping cylinder 7.

Figure 5:
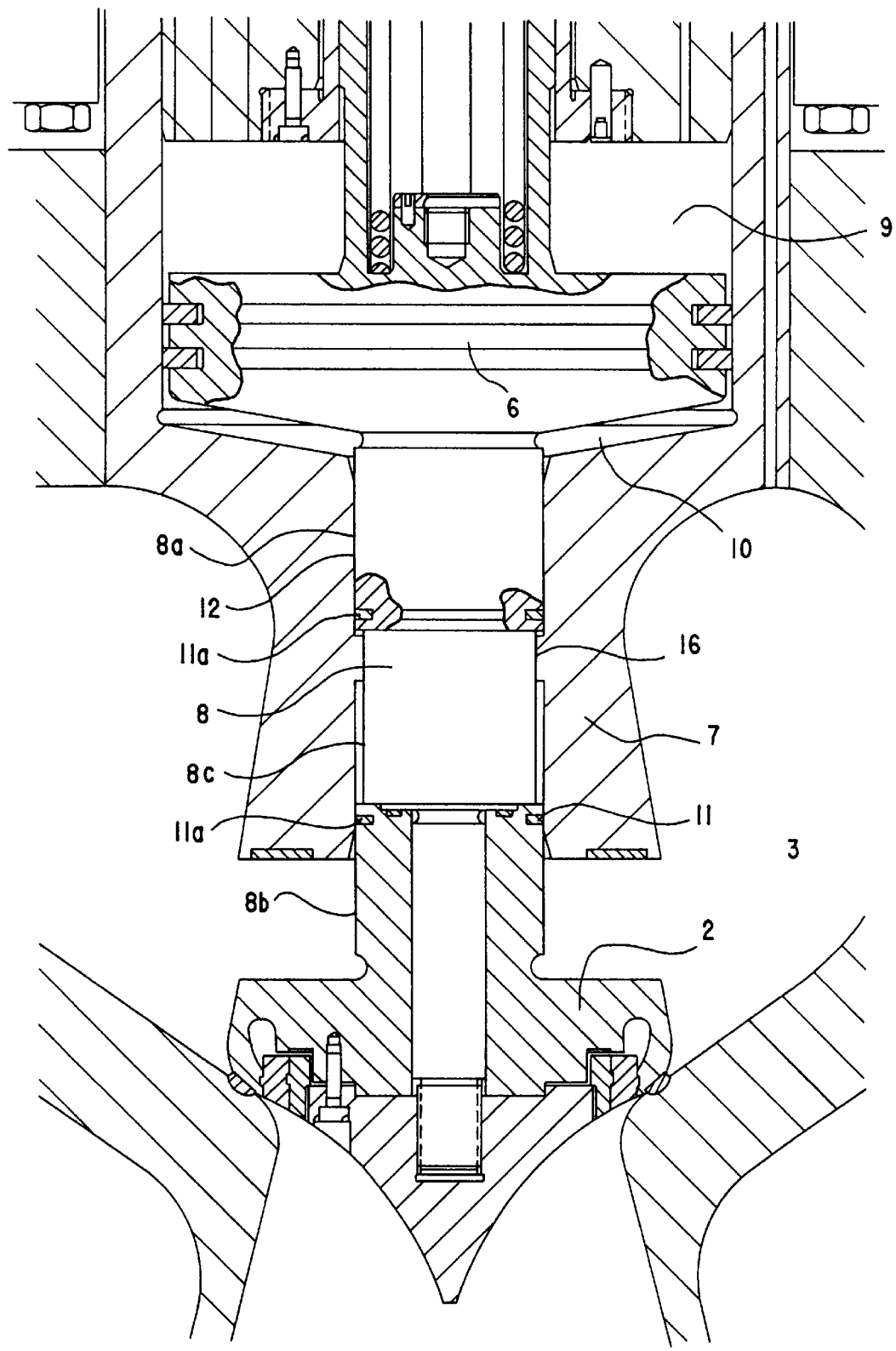
FIG. 5 is an enlarged, fragmentary, vertical-sectional view of a portion of FIG. 4.

FIG. 5 is an enlarged view again showing the region of the adjusting piston 6 which communicates with the valve cone 2 through the damping piston 8. It can clearly be seen that the damping piston 8 has two first piston portions 8a and 8b and a second, constricted piston portion 8c. The first throttle gaps 11 can be seen between the piston rings 11a and the wall surface of the damping cylinder 7. The second throttle gaps 12 can be seen between the piston portions 8a and 8b and the wall surface of the damping cylinder 7. The protrusion 16 corresponds with the constricted portion 8c of the damping piston 8.

Figure 6:
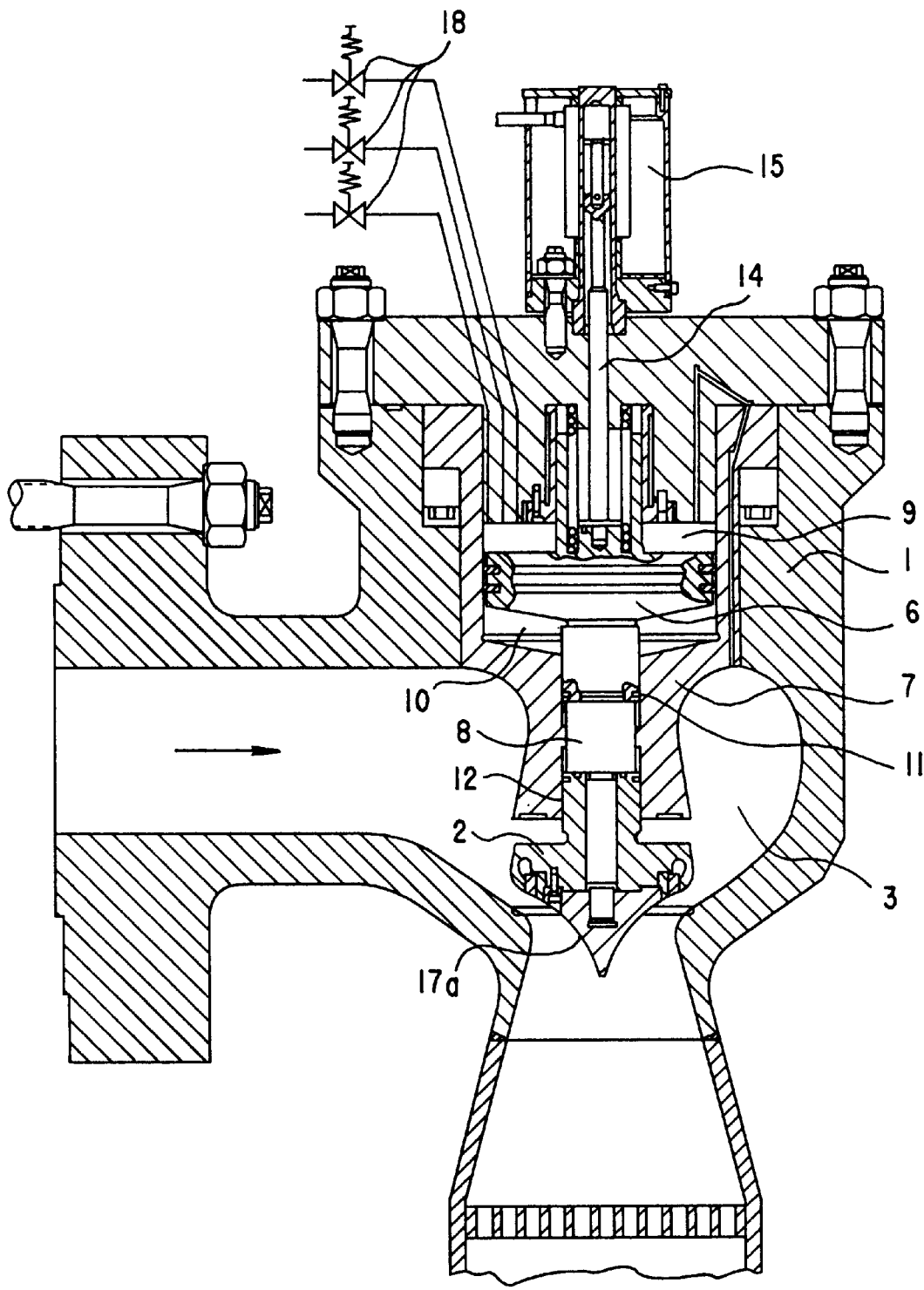
FIG. 6 is a view according to FIG. 4, with the valve half-open.

FIG. 6 is a vertical section through the valve of FIG. 4, in which the valve is open. It can be seen that the underside or lower surface of the valve cone 2 has lifted away from the valve seat. The control valves 18 are open.

Figure 7:
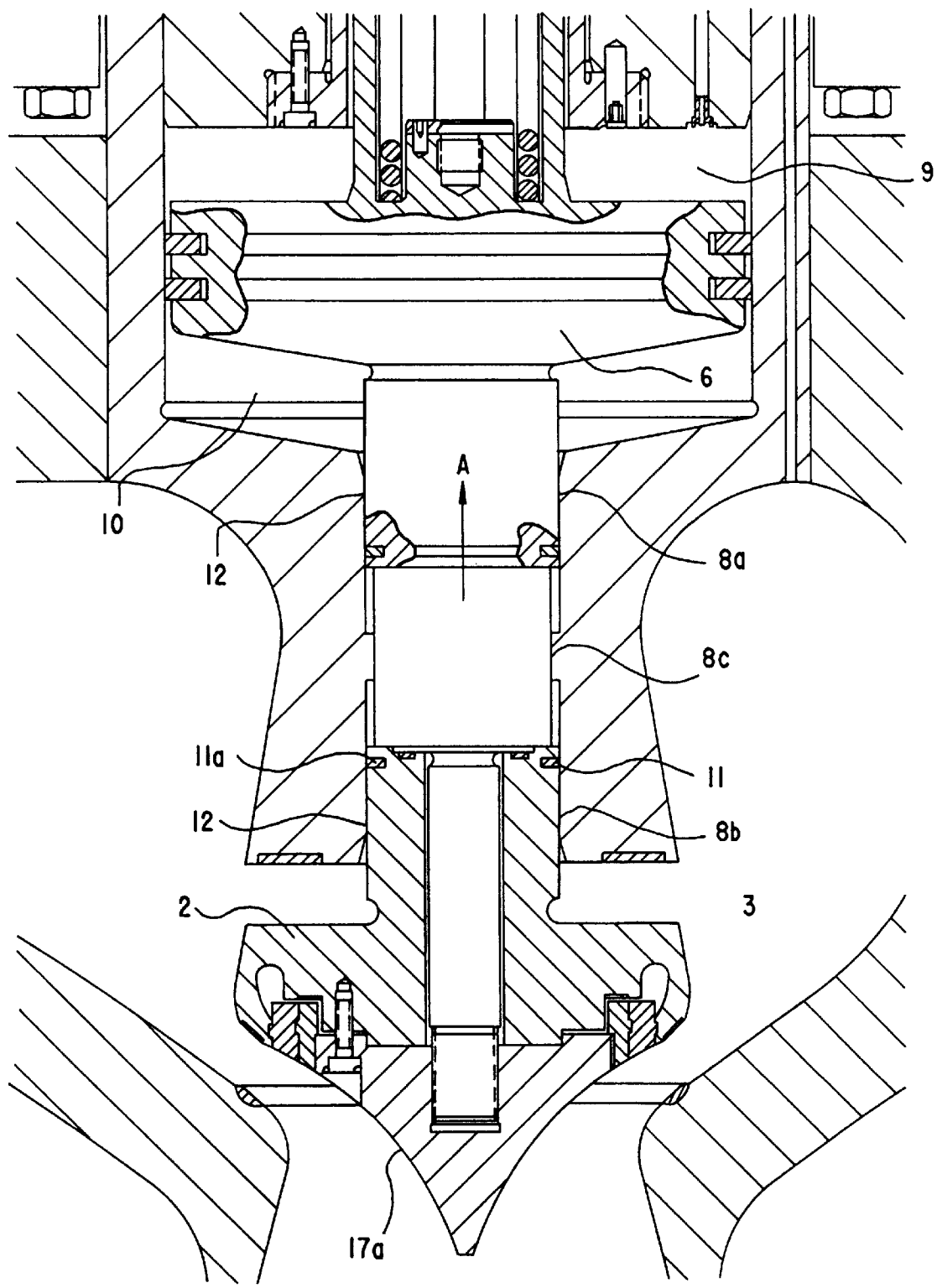
FIG. 7 is an enlarged, fragmentary, vertical-sectional view of a portion of FIG. 6.

FIG. 7 is an enlarged view of the region of the adjusting piston 6, the damping piston 8 and the valve cone 2, in which the latter is in a half-open position. An arrow A indicates the direction of motion of the movable valve fixtures during opening. In this position, the volume of the control chamber 9 is approximately equivalent to the volume of the damping chamber 10.

Figure 8:
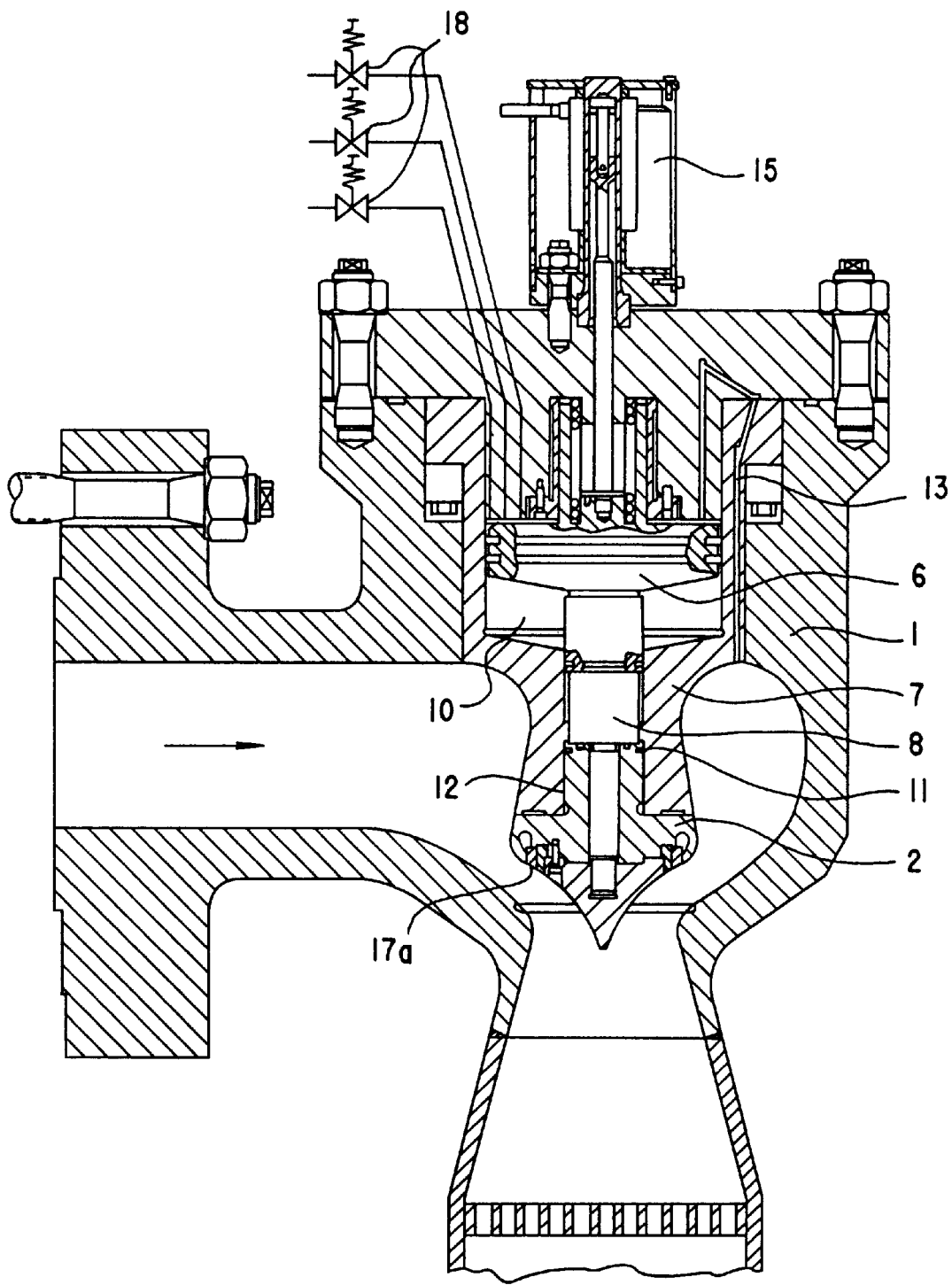
FIG. 8 is a view according to FIG. 4, with the valve fully open.

FIG. 8 is a vertical section through the valve in the fully open position. The volume of the damping chamber 10 in this position is maximally filled with pressure medium.

Figure 9:
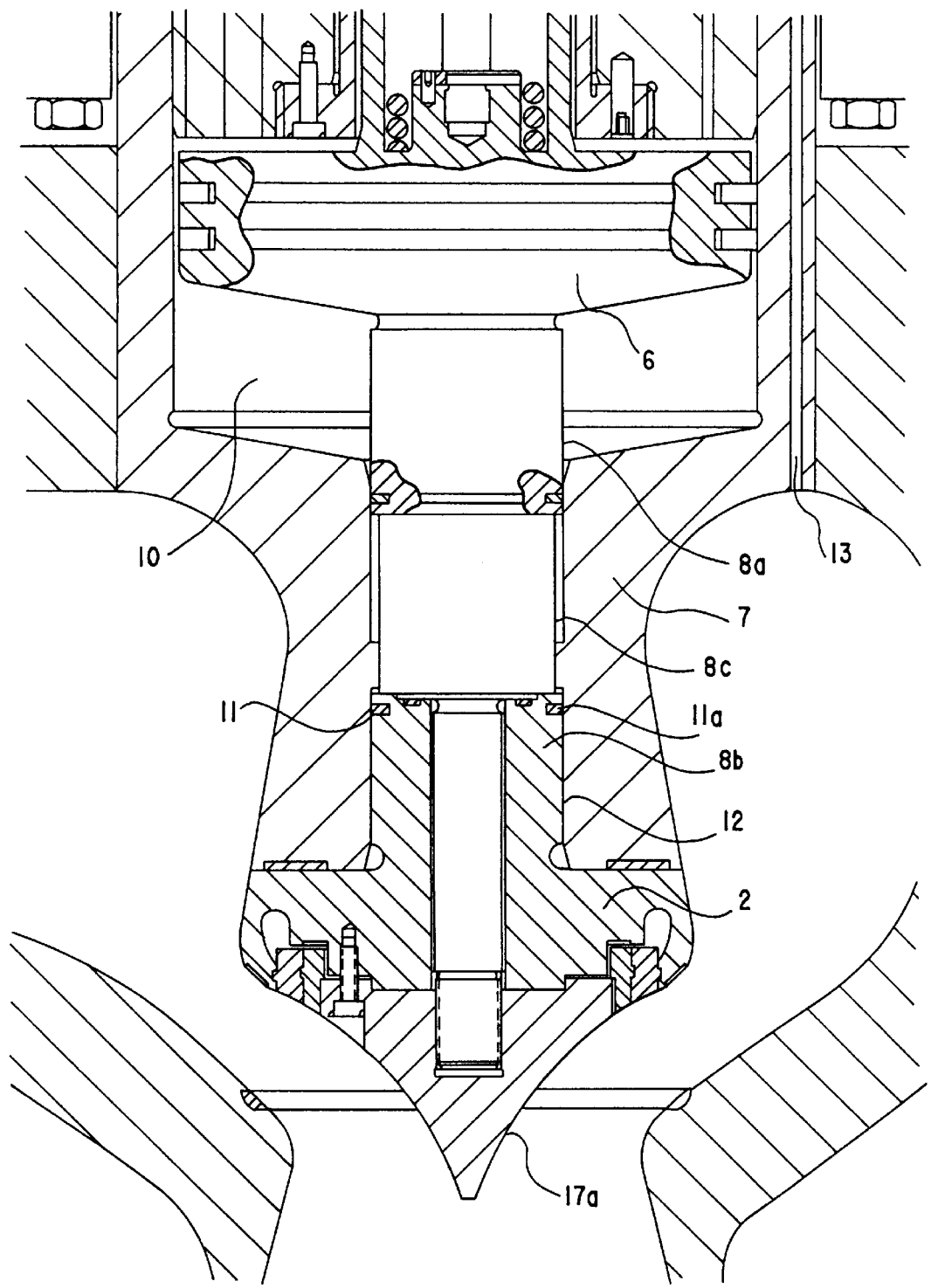
FIG. 9 is an enlarged, fragmentary, vertical-sectional view of a portion of FIG. 8.

FIG. 9 shows the region of the adjusting piston 6, the damping piston 8 and the valve cone 2, in an enlarged view.

Figure 10:
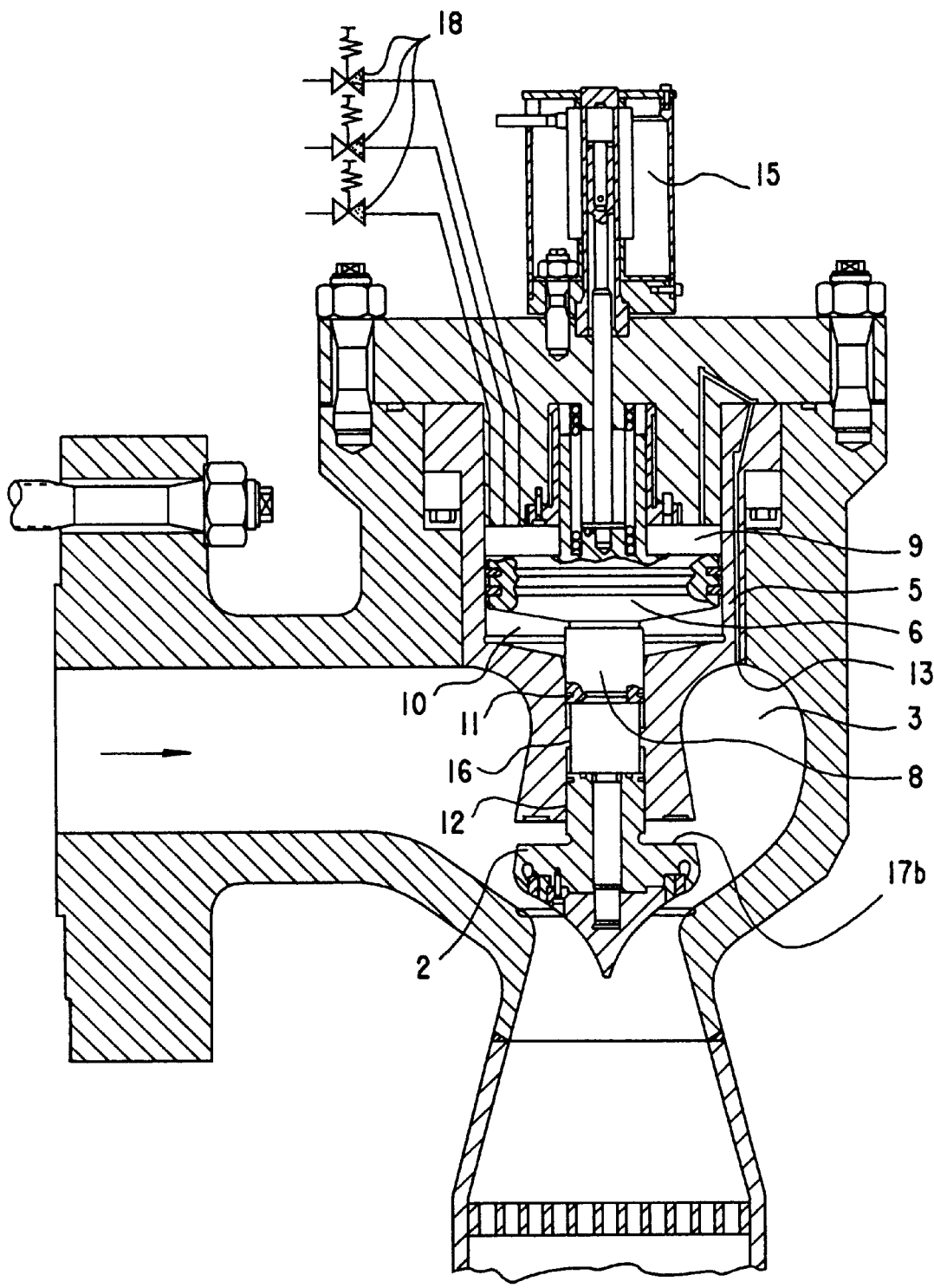
FIG. 10 is a view according to FIG. 4, with the valve half-closed.

FIG. 10 shows a vertical section through the valve of FIG. 1 in the half-closed position. It can be seen that the control valves are in the closed position, so that the control chamber 9 communicates with the pressure-impinged valve interior 3, in particular through the bore 13.

The function of the damped valve according to the invention is as follows:

As is shown in FIG. 1, in normal operation, that is in the closed position of the damped valve, the control chamber 9 is acted upon through the bore 13 with the pressure that prevails in the valve interior 3. The damping chamber 10 communicates through the overflow conduit 20 provided with the throttle insert 19, or through one or more throttle gaps 11 or 12 as is shown in FIGS. 3–10. The control valves 18 are opened for opening the valve, as is diagrammatically shown in FIG. 6. The pressure acting on the underside or lower surface of the adjusting piston 6, through the throttle insert 19 or one or more of the throttle gaps 11, 12, pushes the adjusting piston upward. As soon as the valve cone 2 has left its seat, the system pressure also engages the underside or lower surface 17a of the valve cone 2 and lends it an additional force component acting in the opening direction of the valve. However, because the replenishing flow of pressure medium into the damping chamber 10 is throttled, the upward motion of the adjusting piston 6 and of the valve cone 2 connected to it takes place slowly or in other words is damped.

The control valves 18 are closed in order to close the valve. The pressure prevailing in the valve interior 3 then acts through the bore 13 on the top side or upper surface of the adjusting piston 6. The force generated by the pressure and by the weight of the adjusting piston 6, the damping piston 8 and the valve cone connected to them, causes pressure medium located in the damping chamber 10 to be forced into the valve interior 3 through the throttle insert 19 or the throttle gap or gaps 11, 12. Moreover, a top side or upper surface 17b of the valve cone 2 is engaged by the flow forces of the blown-off pressure fluid, which lend the valve cone 2 an additional force component acting in the closing direction of the valve. However, since the outflow of pressure medium located in the damping chamber 10 into the valve interior 3 is throttled, the closing motion of the adjusting piston 8 and of the valve cone 2 connected to it is damped.

We claim:

1. A valve, comprising:

a valve interior;

a shutoff device for said valve interior, said shutoff device moveable in closing and opening directions;

a cylinder;

a piston guided in said cylinder for positioning said shutoff device and forming a first chamber and a second chamber in said cylinder;

a throttle path communicating between said second chamber and said valve interior for damped movement of said shutoff device in said closing and opening directions; and a separate bore without a throttle connecting said valve interior to said first chamber.

2. The valve according to claim 1, wherein said throttle path is formed by at least one overflow conduit having a throttle insert.

3. The valve according to claim 1, including another cylinder having a wall surface, and a damping piston guided in said other cylinder and connecting said shutoff device to said piston, said throttle path formed by at least one throttle gap between said wall surface of said other cylinder and said damping piston.

4. The valve according to claim 3, wherein at least one of said pistons has at least one groove formed therein for receiving a piston ring.

5. The valve according to claim 3, wherein said at least one throttle gap is at least two throttle gaps having different pressure fluid admissibility.

6. The valve according to claim 3, wherein said damping piston has a constricted portion, and said other cylinder has a protrusion corresponding to said constricted portion.

7. The valve according to claim 6, wherein said at least one throttle gap, said constricted portion, and said protrusion extend uninterruptedly all the way around.

8. The valve according to claim 1, including a device for indicating a stroke of said piston.

9. The valve according to claim 1, including at least one shutoff element for relieving a pressure prevailing in said first chamber.

* * * * *